United States Patent
Bushee et al.

(10) Patent No.: US 7,146,409 B1
(45) Date of Patent: Dec. 5, 2006

(54) SYSTEM AND METHOD FOR EFFICIENT CONTROL AND CAPTURE OF DYNAMIC DATABASE CONTENT

(75) Inventors: William J. Bushee, Sioux Falls, SD (US); Thomas W. Tiahrt, Sioux Falls, SD (US)

(73) Assignee: BrightPlanet Corporation, Sioux Falls, SD (US)

( * ) Notice: Subject to any disclaimer, the term of this patent is extended or adjusted under 35 U.S.C. 154(b) by 994 days.

(21) Appl. No.: 09/911,434

(22) Filed: Jul. 24, 2001

(51) Int. Cl.
*G06F 15/16* (2006.01)

(52) U.S. Cl. ............... 709/219; 709/203; 709/217; 707/3

(58) Field of Classification Search .............. 707/3, 707/10, 1, 6–7; 709/217, 219, 200–203, 709/218, 225, 227
See application file for complete search history.

(56) References Cited

U.S. PATENT DOCUMENTS

| | | | | |
|---|---|---|---|---|
| 5,940,834 A * | 8/1999 | Pinard et al. | ............... | 707/102 |
| 6,012,053 A * | 1/2000 | Pant et al. | ............... | 707/3 |
| 6,182,065 B1 * | 1/2001 | Yeomans | ............... | 707/3 |
| 6,199,061 B1 * | 3/2001 | Blewett et al. | ............... | 707/3 |
| 6,253,208 B1 * | 6/2001 | Wittgreffe et al. | ......... | 707/104.1 |
| 6,278,993 B1 * | 8/2001 | Kumar et al. | ............... | 707/3 |
| 6,321,228 B1 * | 11/2001 | Crandall et al. | ............ | 707/10 |
| 6,418,433 B1 * | 7/2002 | Chakrabarti et al. | ......... | 707/5 |
| 6,463,430 B1 * | 10/2002 | Brady et al. | ............... | 707/3 |
| 6,480,837 B1 * | 11/2002 | Dutta | ............... | 707/3 |
| 6,526,479 B1 * | 2/2003 | Rosenzweig | ............... | 711/133 |
| 6,718,365 B1 * | 4/2004 | Dutta | ............... | 709/203 |
| 2003/0009439 A1 * | 1/2003 | Lee | ............... | 707/1 |

OTHER PUBLICATIONS

IETF Network Wroking Group; RFC 2068: The HTTP/1.1 Protocol; Published: Jan. 1997.*
Harold, Elliotte; JAVA™ Network Programming; O'Reilly Press, 2nd Edition; pp. 117-120, 160-164, and 322-323; Published: Aug. 2000.*

* cited by examiner

*Primary Examiner*—Moustafa M. Meky
(74) *Attorney, Agent, or Firm*—Patterson, Thuente, Skaar & Christensen, P.A.

(57) ABSTRACT

A system and method for efficient control and capture of dynamic database content for rapidly providing a user with a highly relevant collection of documents related to a query. The system and method for efficient control and capture of dynamic database content includes a computer system with storage for facilitating the retention and recall of dynamic database content and a communications module for facilitating bi-directional communication of the computer system with local or distributed networks; an executory module operationally coupled to the computer system for controlling the storage and the communications module as well as directing the system for the efficient control and capture of dynamic database content to a plurality of pre-selected Internet sites; and a capture module which is in communication with the executory module and facilitates selection of the plurality of Internet sites associated with a query submitted by a user of the system.

52 Claims, 8 Drawing Sheets

| Offset Segment | Length Segment | Last Time Checked Segment | Hits Segment | Highest Score Segment | Database Segment |
|---|---|---|---|---|---|
| 0 | 0 | 0 | 0 | 0 | 0 |
| 1 | 1 | 1 | 1 | 1 | 1 |
| 2 | 2 | 2 | 2 | 2 | 2 |
| 3 | 3 | 3 | 3 | 3 | 3 |
| N-1 | N-1 | N-1 | N-1 | N-1 | N-1 |
| N | N | N | N | N | N |

Figure 7

SYSTEM AND METHOD FOR EFFICIENT CONTROL AND CAPTURE OF DYNAMIC DATABASE CONTENT

BACKGROUND OF THE INVENTION

1. Incorporation by Reference

This patent application discloses an invention which may optionally form a portion of a larger system. Other portions of the larger system are disclosed and described in the following co-pending patent applications, all of which are subject to an obligation of assignment to the same person. The disclosures of these applications are herein incorporated by reference in their entireties.

METHOD AND SYSTEM FOR AUTOMATIC HARVESTING AND QUALIFICATION OF DYNAMIC DATABASE CONTENT, William J. Bushee, Thomas W. Tiahrt, and Michael K. Bergman, and Filed Jul. 24, 2001, application Ser. No. 09/911,522, pending.

METHOD FOR AUTOMATIC SELECTION OF DATABASES FOR SEARCHING, William J. Bushee, Filed Jul. 24, 2001, application Ser. No. 09/911,452, now U.S. Pat. No. 6,711,569, issued Mar. 23, 2004.

AUTOMATIC SYSTEM FOR CONFIGURING TO DYNAMIC DATABASE SEARCH FORMS, William J. Bushee, Filed Jul. 24, 2001, application Ser. No. 09/911,435, pending.

2. Field of the Invention

The present invention relates to search engines and more particularly pertains to a new system and method for efficient control and capture of dynamic database content for rapidly providing a user with a highly relevant collection of documents related to a query.

3. Description of the Prior Art

The Internet is a worldwide system of computer networks in which users at any one computer may get information located on virtually any other computer with appropriate authorization. The Internet uses a set of protocols called Transmission Control Protocol/Internet Protocol or TCP/IP. The World Wide Web (often abbreviated as WWW) is a portion of the Internet using hypertext as a method for rapid cross-referencing that links one document or site to another.

A database is a collection of data, which is organized in a manner that allows its contents to be easily accessed, managed, and updated. Given this definition an Internet site can be viewed as a database with a collection of data that can be viewed as pages, or accessible documents. Similarly, any network for accessing documents can be considered a database, including intranets and extranets. These network databases can be either static or dynamic. A static network database provides the same set of documents or pages to every user. A dynamic network database presents unique documents or pages to different users, typically as a response to the users' queries.

The use of search engines is known in the prior art. The Internet, as well as the predecessor ARPANET, has since its inception held the promise of real-time access to an almost inexhaustible supply of information, stored on computers throughout the world. Sorting through the information available to find documents relevant to a given question or query can be laborious; and a method to speed this process is needed. Search engines allow a user to search for sites that have one or more keywords corresponding to the user's query. This development has sped up the process of finding sites, but has not necessarily improved the quality of the results. While it is true that millions of documents are readily available as static pages to users through search engines, much more of the total content of the Internet has remained in the shadows. This remaining content, while available, often requires independent knowledge of the exact location of the document, sophisticated search techniques, or in many cases the use of professional researchers to attempt to "mine" the needed information.

Search engines have been improved through the use of link-followers also known as "crawlers", which allow a search engine to follow links on a known web page to discover other web pages as new sources of information and to build an index. Crawlers are an improvement over conventional search engines in that they can provide more sites that are relevant to a given question or query. But again, as was the case with conventional search engines, only static pages have been available as results to the user. Some of the static pages may be entry-points for databases, which can provide very relevant and detailed information by continued searching. However the use of these entry points conventionally requires the laborious task of manually entering the user's question in the specific data-entry windows for each database, capturing the results, and then analyzing the results from each database for relevancy.

SUMMARY OF THE INVENTION

In view of the foregoing disadvantages inherent in the known types of search engines now present in the prior art, the present invention provides a new system and method for efficient control and capture of dynamic database content construction wherein the same can be utilized for rapidly providing a user with a highly relevant collection of documents related to a query.

The present invention generally comprises a computer system with a storage means for facilitating the retention and recall of dynamic database content and a communications means for facilitating bi-directional communication of the computer system with local or distributed networks. An executory module is operationally coupled to the computer system for controlling the storage means and the communications means as well as directing the system for the efficient control and capture of dynamic database content to a plurality of pre-selected Internet sites. A capture module is in communication with the executory module and facilitates selection of the plurality of Internet sites associated with a query submitted by a user of the system.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The objects of the invention, along with the various features of novelty that characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 7 thereof, a new system and method for efficient control and capture of dynamic database content embodying the principles and concepts of the present invention will be described.

As best illustrated in FIGS. 1 through 7, the system 10 for efficient control and capture of dynamic database content generally comprises a computer system 20, an executory module 30, a capture module 60, and a query input means 22.

Figure 2:
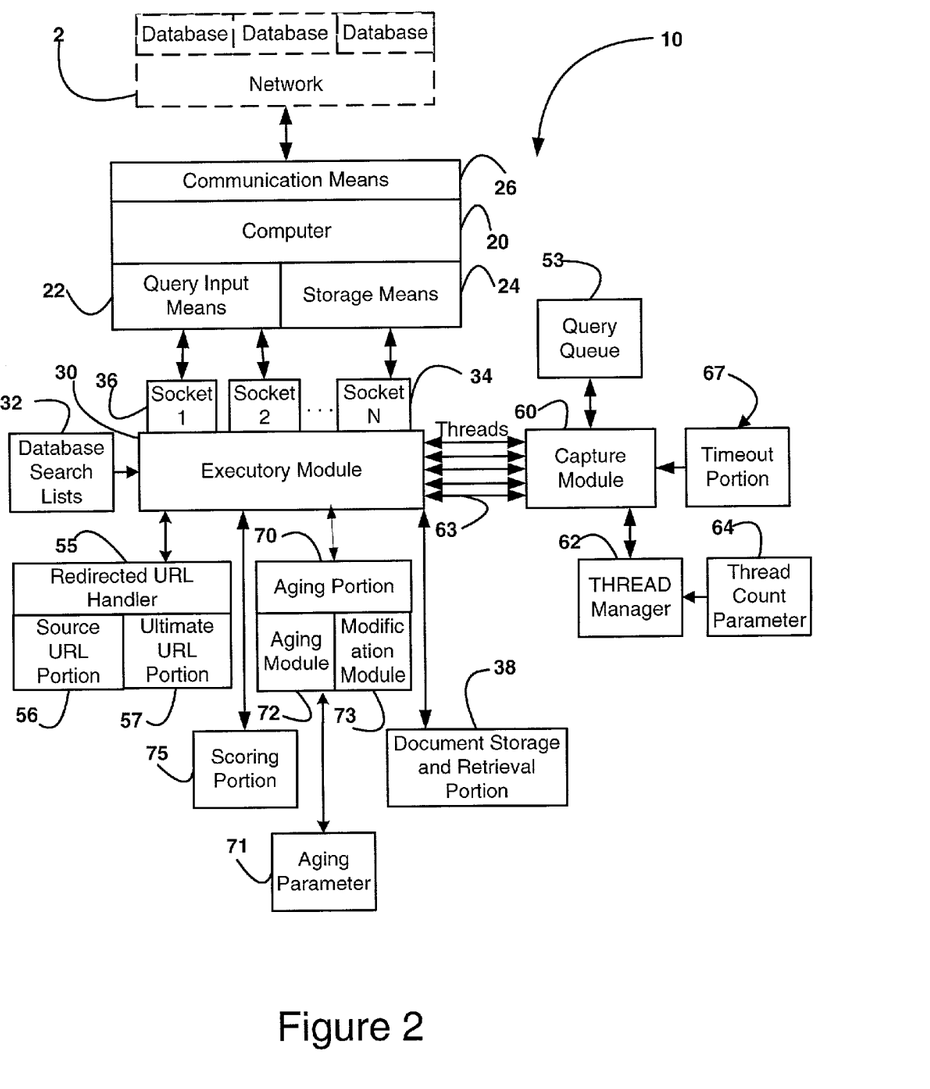
FIG. 2 is a schematic functional interconnect flow diagram of the present invention.

The computer system 20 includes a storage means 24 for facilitating retention and recall of dynamic database content. The computer system 20 also includes a communications means 26 for facilitating bi-directional communication of the computer system 20 with networks such as local networks, commonly referred to as intranets, and distributed networks, which may include extranets and the Internet.

The executory module 30 of the system 10 is interfaced to the computer system 20 and controls the storage means 24 and the communications means 26. The executory module 30 directs the system to a plurality of pre-selected network sites or databases 2. Hereinafter, references to "databases" should be understood to include sites on intranets and the Internet separate from the system 10.

The capture module 60 of the system 10 is in communication with the executory module 30 and facilitates selection of the plurality of network databases 2 that are associated with a query submitted by a user of the system 10.

The system 10 may include query input means 22 for receiving a query, or a plurality of queries, from a user. The query input means 22 may transfer the plurality of queries (received from the user) to the capture module 30.

In one embodiment of the invention, the query input means 22 comprises an input module. The input module may comprise, for example, a keyboard, a mouse, a data input device capable of converting action of a user to a machine readable query, a data file transferred as one or more electrical signals to the computer system 20, a data file transferred as one or more optical signal to the computer system 20, a data file written to memory in the computer system 20 accessible by the capture module 60, and a data file written to a storage medium accessible by the capture module 60.

A database search listing 32 may be included to provide the capture module 60 with a listing of a plurality of pre-selected databases 2 to which user defined queries may be submitted.

The database search listing 32 may further comprise at least one field that conveys information for formatting of a query to be submitted to at least one of the plurality of pre-selected databases 2.

The executory module 30 may further comprise a network connectivity portion 34 for establishing and maintaining bi-directional connectivity between the computer system 20 and networks (such as the Internet) to facilitate the transmittal of at least one query to at least one site on a network. The network connectivity portion 34 may also establish and maintain bi-directional connectivity between the computer system 10 and a local network (such as an intranet) to allow queries from a user to be directed at both external databases (Internet) and internal databases (intranet). The network connectivity portion 34 may use a plurality of sockets 36 to establish and maintain bidirectional connectivity with the network.

Figure 6:
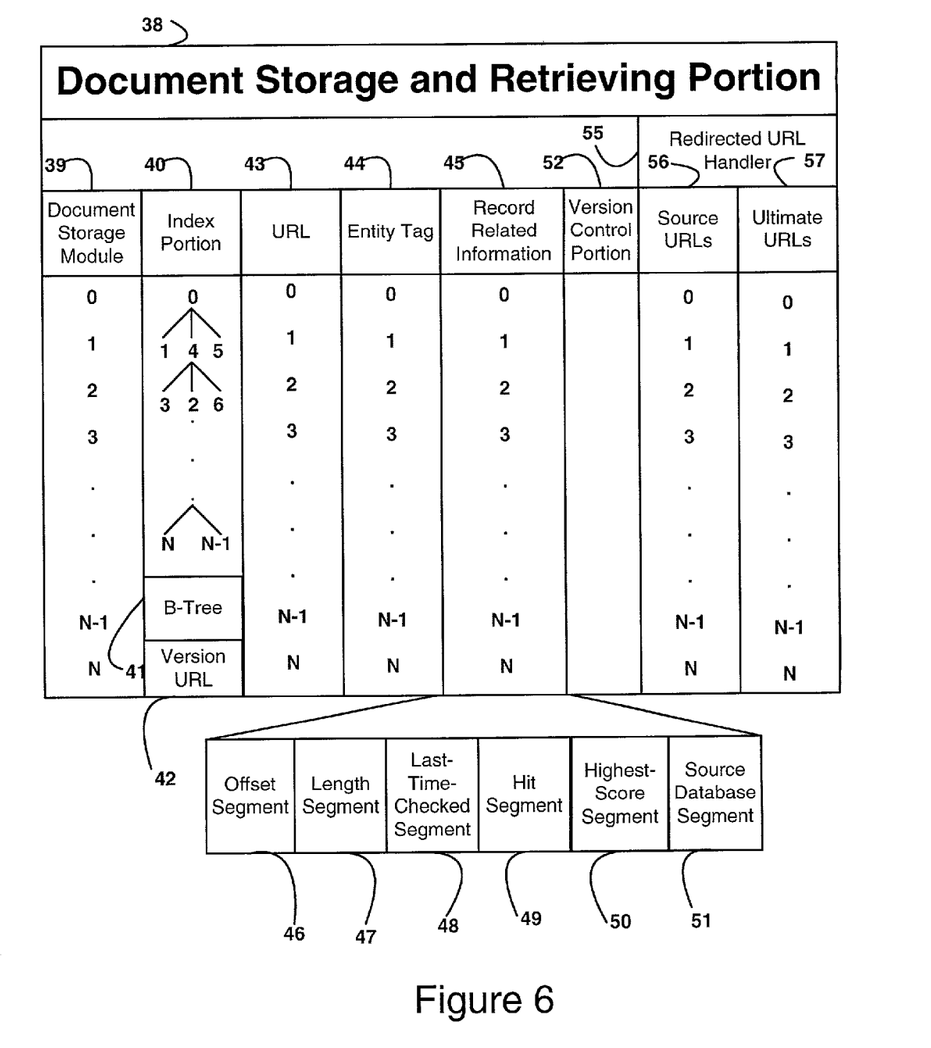
FIG. 6 is a schematic diagram of the document storage and retrieval portion of the present invention.

The executory module 30 may further comprise a document storage and retrieval portion 38 for retaining documents. The documents in the document storage and retrieval portion may comprise documents that have been returned in reply to one of the plurality of queries submitted to each associated one of the plurality of databases 2. The documents are thus saved on the system at a location that is separate and distinct from the source site on the network from where the document was retrieved.

The document storage and retrieval portion 38 may further comprise a document storage module 39 for retaining each one of a plurality of documents as part of an indexed array for facilitating rapid retrieval of a document by the user. A document may be a web page, or an accessible file in a variety of formats. Illustrative examples of these formats include, but are not limited to, text, HTML, and PDF files.

Significantly, the document storage module 39 stores each one of the plurality of documents as part of a binary stream of data. The entire collection of documents in the document storage is stored in a single file. Each one of the plurality of documents is separately and individually accessible.

The document storage and retrieval portion 38 may further comprise an index portion 40 for recording the stored location of each document in the document storage module for facilitating rapid recall of any one of the plurality of documents from the document storage module 39. The index portion 40 may further comprise a B-tree 41 and a plurality of core version uniform resource locators 42 (URLs).

The B-tree 41 is used as an indexing structure for the plurality of documents. A B-tree 41 is a method of placing and locating files in a database. The use of a B-tree 41 minimizes the number of steps necessary to locate a desired document. As an example, if a database were to be stored on a disk drive the use of a B-tree 41 would minimize the number of times that the drive would have to be accessed to get a specific document. In a B-tree 41, decision points are called nodes. Every node has between t-1 and 2t-1 children or branches, where t is an arbitrary constant. This is a preferred structure for minimizing the time required to access a specific document; because the height of the tree, and therefore the number of accesses, can be kept small by picking a large value for t. In other words, more branches extending from each node creates a flatter but broader tree, and fewer steps are required to get to a specific document.

A URL is the address of a file or document which is accessible on the Internet. The URL contains the name of the protocol required to access the file or document, such as "ftp" or "http"; a domain name which identifies the specific computer on the network which has the file or document; and a hierarchical description of the location of the file or document on that specific computer.

The plurality of core version uniform resource locators 42 provide a path back to a source document from an associated one of the databases 2 on a source site of the network. This part permits reestablishment of a connection with the database 2 which provided the source document and allows the database 2 to be analyzed by the user.

A core version of the URL is essentially a URL that is common to all of the extended variations of a URL which lead to the same document or page on a source site. As an illustrative example, a document may be found at a URL of "http://www.generic_example.com". This same document may also be accessible through additional URLs such as: "http://generic_example.com"; "http://generic_example.com/"; or "http://generic_example.com\index.asp". Illustratively, for the above variations, the core version for this document may be "generic_example.com".

The document storage and retrieval portion 38 may further comprise a uniform resource locator module 43, an entity tag portion 44, a record related information portion 45, and a version control portion 52. The uniform resource locator module 43 is used for retaining a uniform resource locator for each one of the plurality of documents returned by each one of the plurality of databases 2. The entity tag portion 44 is used for retaining an entity tag for each one of the plurality of documents returned by each one of the plurality of databases 2. Entity Tags are defined in the Hyper-Text Transfer Protocol version 1.1.

Figure 7:
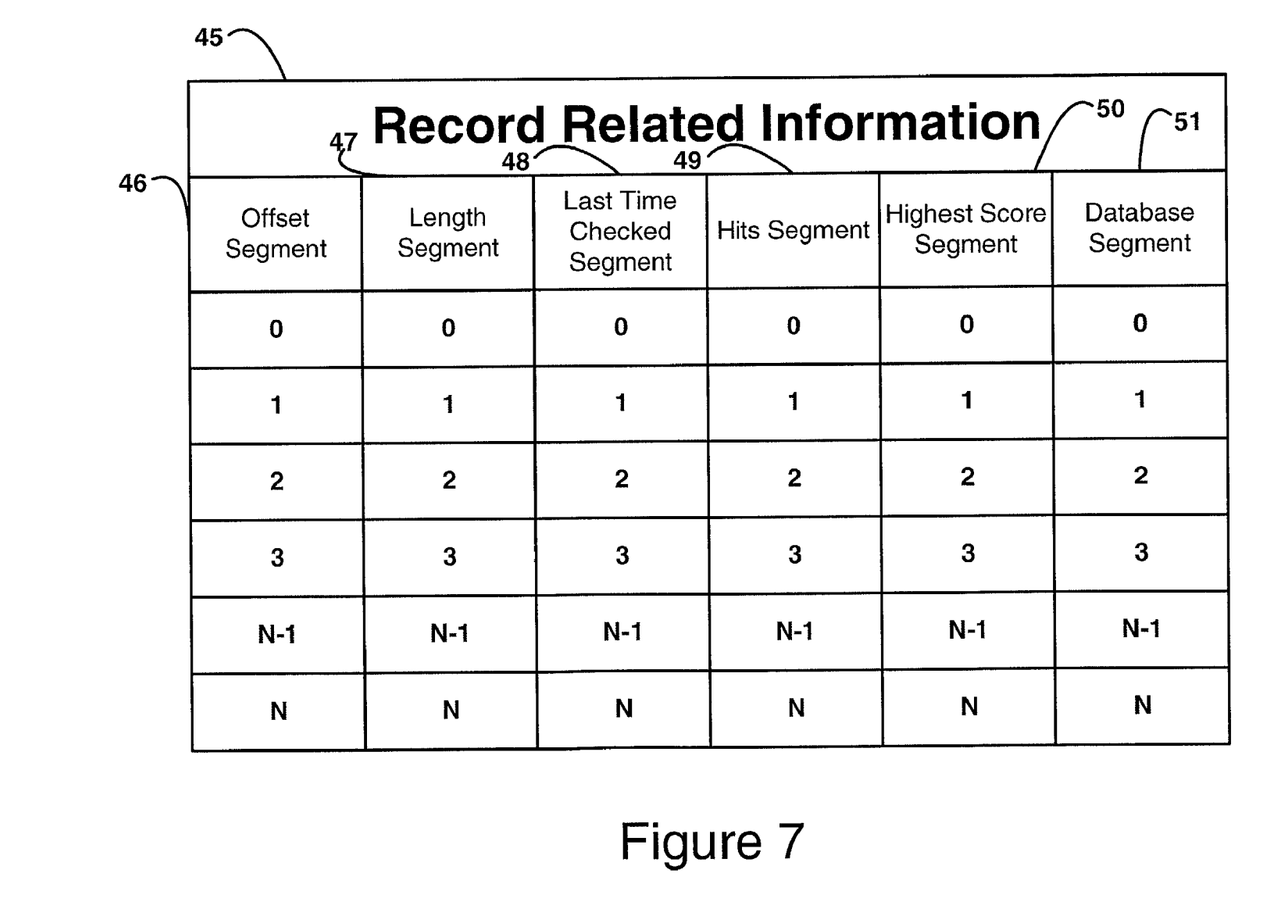
FIG. 7 is a schematic diagram of the record related information portion of the present invention.

The record related information portion 45 contains parametric information associated with each one of the plurality of documents. The record related information portion 45 facilitates analysis of each one of the plurality of documents.

The record related information portion 45 may comprise a plurality of segments, including offset segments 46, length segments 47, last-time-checked segments 48, hit segments 49, highest-score segments 50, and database segments 51 for each document in the document storage module.

The offset segments 46 for a document represent a starting point for the document in the document storage module. The length segment 47 for a document represents a length of the document in the document storage module. The last-time-checked segment 48 for a document represents the time of the last known occurrence of collecting the document from its network site of origin. The hit segment 49 for a document represents the number of previous requests received by the document storage module for the document. The highest-score segment 50 for a document represents the best results obtained for the document compiled through use of an arithmetic scoring operation. The database segment 51 for a document represents the search engine used to locate the document.

In one embodiment, each one of the plurality of offset segments 46, length segments 47, last-time-checked segments 48, hits segments 49, highest-score segments 50, and database segments 51 comprises a 32 bit representation. Each one of the segments may be stored as part of an array. Each one of the offset segments 46 includes a one to one correspondence with an index portion. The index portion links a stored version of each document with the associated parametric information. Optionally, each one of the plurality of offset segments 46, length segments 47, last-time-checked segments 48, hits segments 49, highest-score segments 50, and database segments 51 may comprise a 64 bit representation which facilitates accessibility of larger file constructs through increased addressing capabilities.

The version control portion 52 of the document storage and retrieval portion is used for recording version identification for the document storage and retrieval portion 38. The version control portion 52 allows the user to verify configuration attributes such a version number or build date of the document storage and retrieval portion 38.

A query queue 53 is used to hold each one of the plurality of queries from the query input means 22 until each one of the queries is transferred to the executory module 30.

Figure 3:
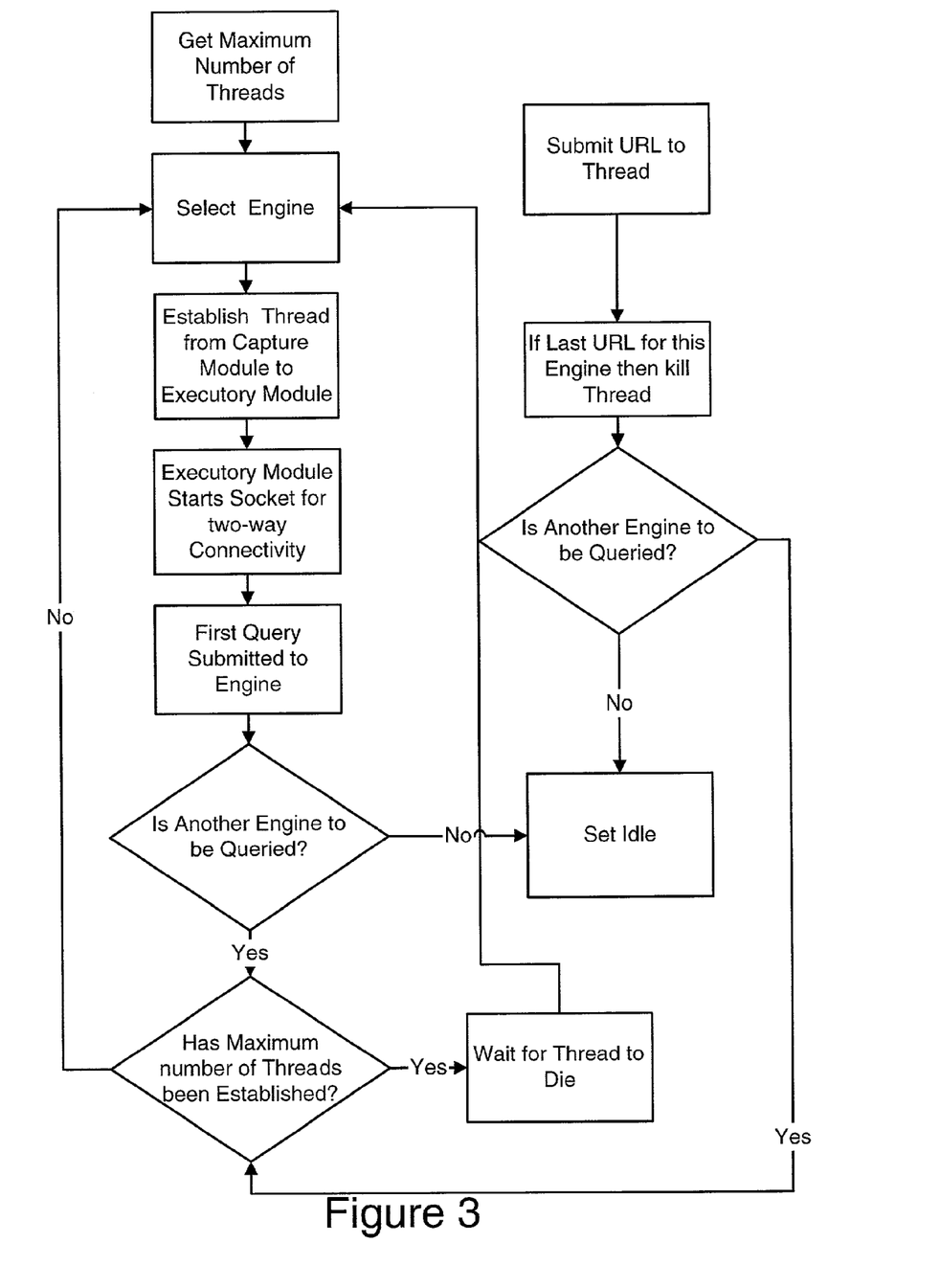
FIG. 3 is a schematic flow diagram of the thread handler portion of the present invention.

The capture module 60 uses a plurality of threads 63 to transfer queries from the capture module to the executory module 30 to thereby establish multiple coexisting sequential flows of control between the capture module 60 and the executory module 30.

A thread manager 62 is used for the creation, management, and termination of the plurality of threads 63 between the capture module 60 and the executory module 30. Each one of the plurality of threads 63 transmits a query from the capture module 60 to the executory module 30 and transmits a reply received through one of the sockets 36 from a database 2 from the executory module 30 to the capture module 60.

The thread manager 62 terminates one of the sockets 36 when a database 2 has completed responses to an associated series of queries. Thus, each thread 63 terminates upon completion of queries and responses associated with a single database 2.

The thread manager 62 may further comprise a simultaneous thread count parameter 64, a thread creation and termination portion 65, and a plurality of monitoring portions 66.

The simultaneous thread count parameter 64 contains a value received from the executory module 30. The simultaneous thread count parameter value is used by the thread manager 62 to set an upper bound for a number of simultaneously coexisting threads 63 forming the plurality of threads 63.

The thread creation and termination portion 65 interacts with an operating system for generating a thread 63 associated with one of the databases 2 to be queried.

Each one of the plurality of monitoring portions 66 is associated with one of the plurality of threads 63. The monitoring portion 66 determines a termination point when all responses associated with each one of the plurality of queries directed to one of the plurality of databases 2 have been returned. The thread creation and termination portion 65 terminates one of the plurality of threads 63 when the termination point is reached by the monitoring portion 66 associated with the one of the plurality of databases 2.

The thread creation and termination portion 65 is operationally linked to the database search listing 32. The thread creation and termination portion 65 generates a new thread 63 if additional databases 2 are to be queried and the simultaneous thread count parameter 64 has not been reached.

The thread manager 62 also includes a timeout portion 67 for determining a termination point for use by the thread creation and termination module 65 when a database 2 being queried fails to respond within a predetermined period of time.

Figure 5:
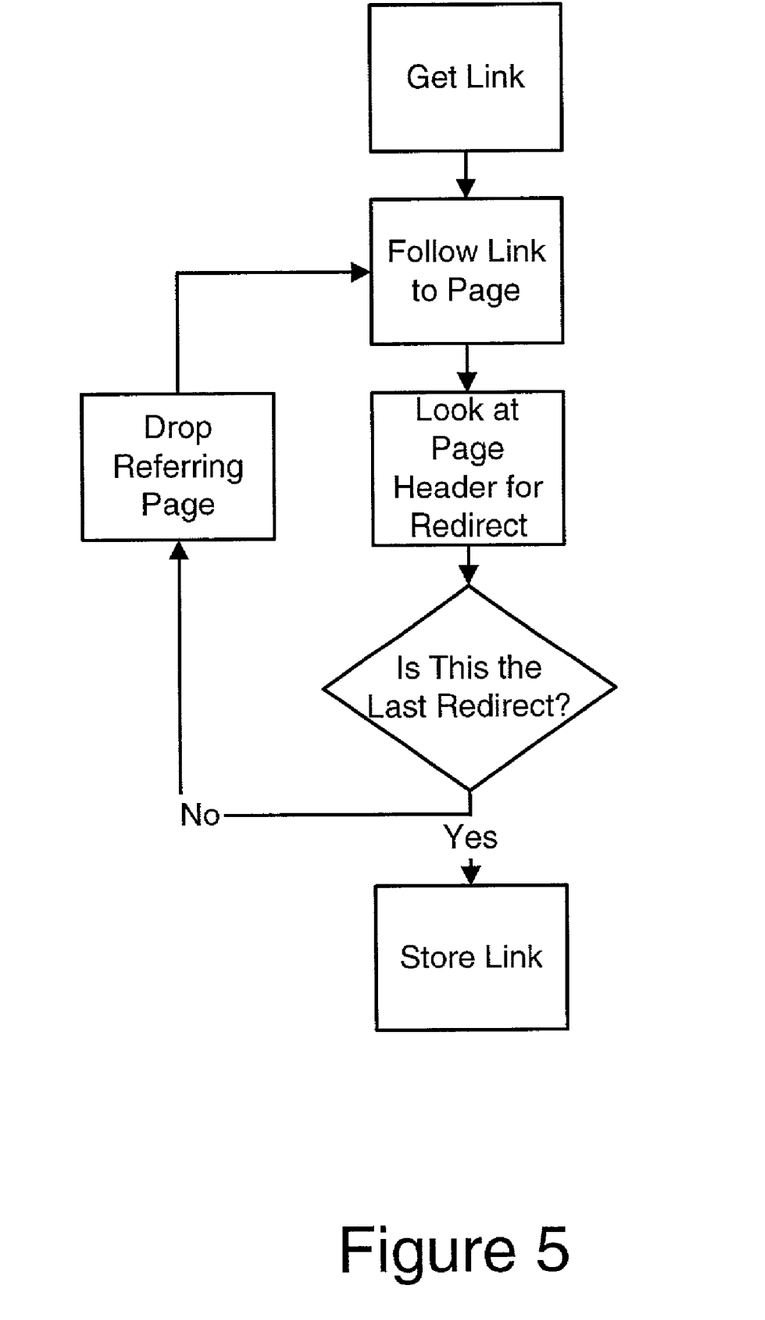
FIG. 5 is a schematic flow diagram of the URL redirect handler portion of the present invention.

A redirected URL handler portion 55 is used for following redirection of an URL through a plurality of redirections to an ultimate destination without maintaining intermediate pages. The redirected URL handler portion 55 provides an URL for the user of the ultimate document.

As an illustrative example, a source page or database 2 may link to an intermediate document, which in turn links to the desired document. The use of a redirecting URL may allow a database 2 to track which documents are retrieved by the user.

Figure 4:
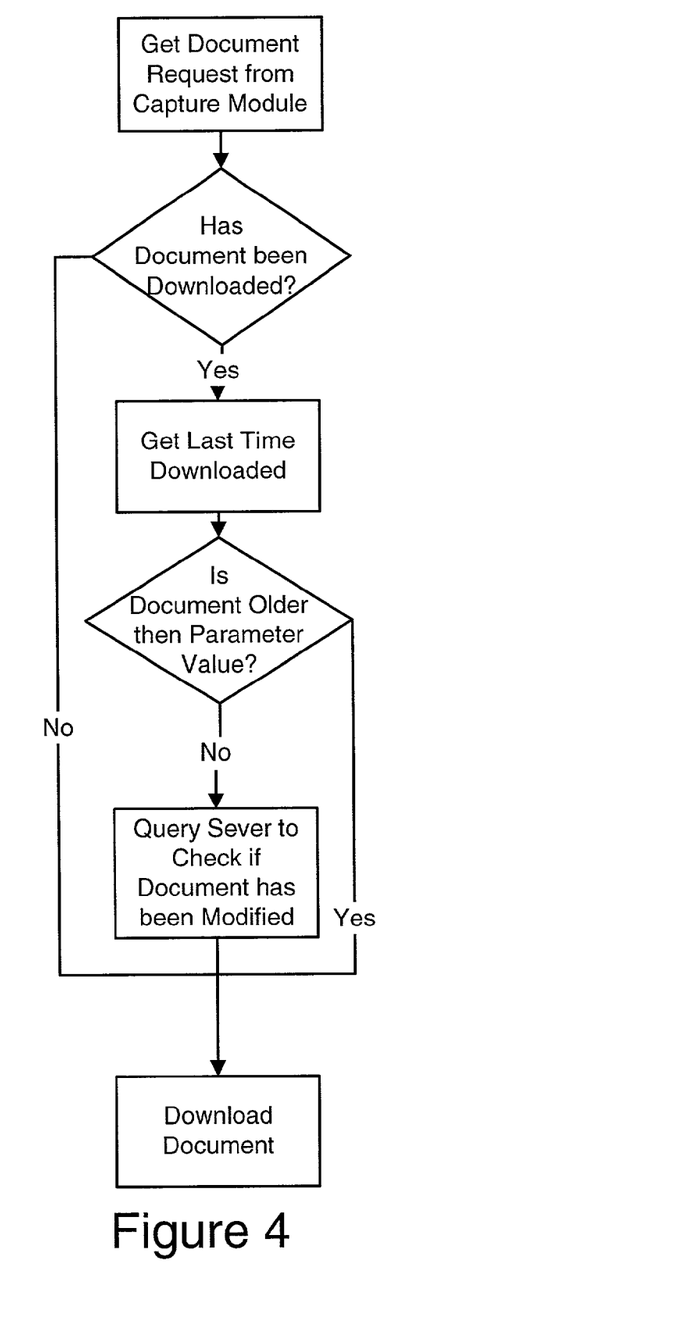
FIG. 4 is a schematic flow diagram of the aging handler portion of the present invention.

The document storage and retrieval portion 38 may further comprise a source URL portion 56, an ultimate URL portion 57, and a document aging portion 70. The source URL portion 56 is for retaining a URL associated with of each one of a plurality of databases 2 providing documents to the system 10. The ultimate URL portion 57 is similarly used for retaining URL associated with each one of a plurality of ultimate destinations obtained through the redirected URL handler portion 55. The document aging portion 70 is for determining if a current version of a document is available from the document storage and retrieval portion 38 or if the document must be retrieved from another source through the network connectivity portion 34.

The document aging portion 70 may still further include an aging parameter 71, an age module 72, and a modification module 73. The aging parameter 71 is used for selecting a predetermined maximum age for a document to be considered current. The age module 72 determines when the document was retrieved from a source and if the age of the document exceeds the age parameter 71. The modification module 73 interrogates a server about any changes made to the document since the document was previously retrieved.

The modification module 73 may use an entity tag to determine if the document has been modified. The modification module 73 may also use a last-modified-since tag, especially if the server does not support use of the entity tag.

A scoring portion 75 is used for evaluating each one of the plurality of documents for relevance against a query provided by the user. The scoring portion 75 provides a numeric representation of relevance for the user.

Figure 1A:
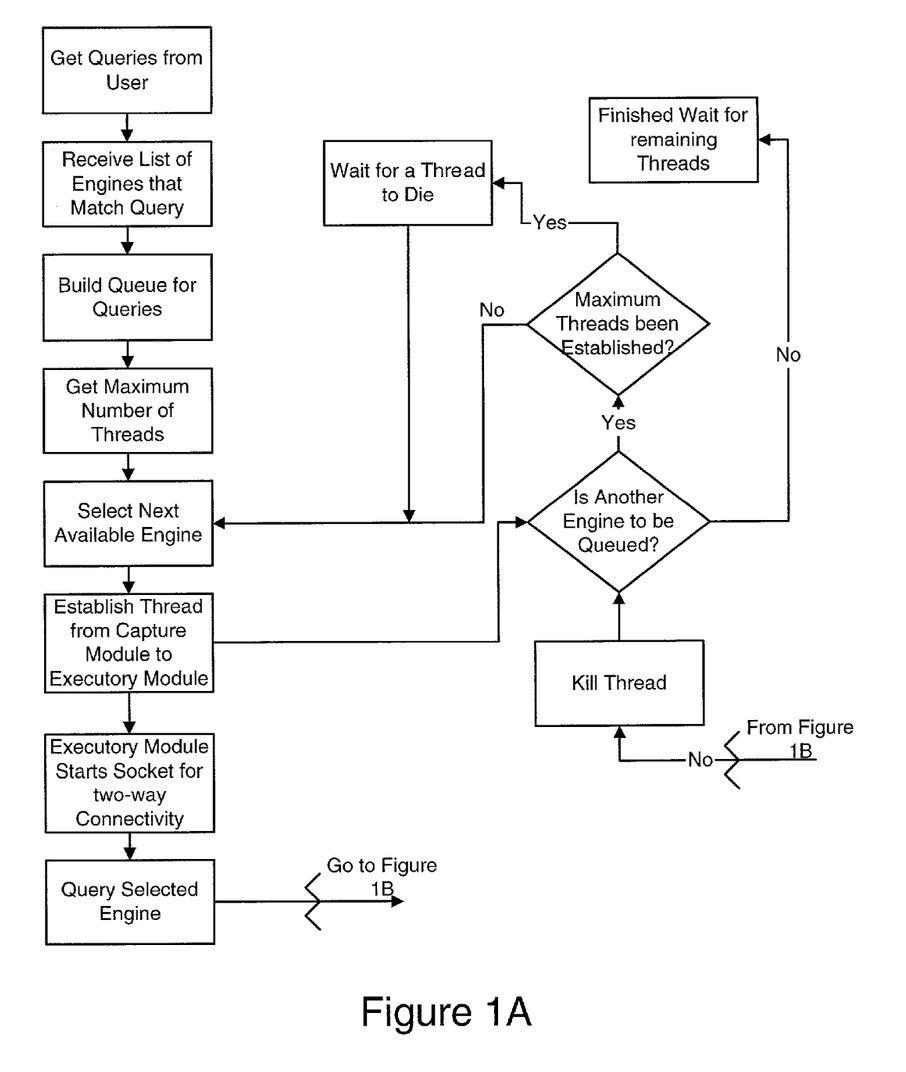
FIG. 1A is a schematic flow diagram of a first portion of a new method for efficient control and capture of dynamic database content according to the present invention.

In use, the user submits a query or a series of queries to be submitted to a plurality of databases. The capture module matches the query to a database search listing and selects only the databases that have been previously determined to be relevant for the specific query from the user. If multiple queries are to be submitted then the queries are queued. The executory module obtains a thread count parameter used to determine a maximum number of simultaneous threads to be used by the system. The capture module then begins to establish multiple threads to the executory module for the bi-directional communication between the system and a network such as the Internet.

The thread manager establishes the thread between the capture and executory module. The thread manager also monitors the threads for completion of document retrieval and a time-out condition. After all of the relevant documents for a given database have been retrieved or the database has timed-out, the thread manager terminates the thread. If another database is to be queried, and the maximum number of threads is not already established, the thread manager will create a new thread. Each thread is created for a specific database, and when that database is finished the thread is terminated.

Figure 1B:
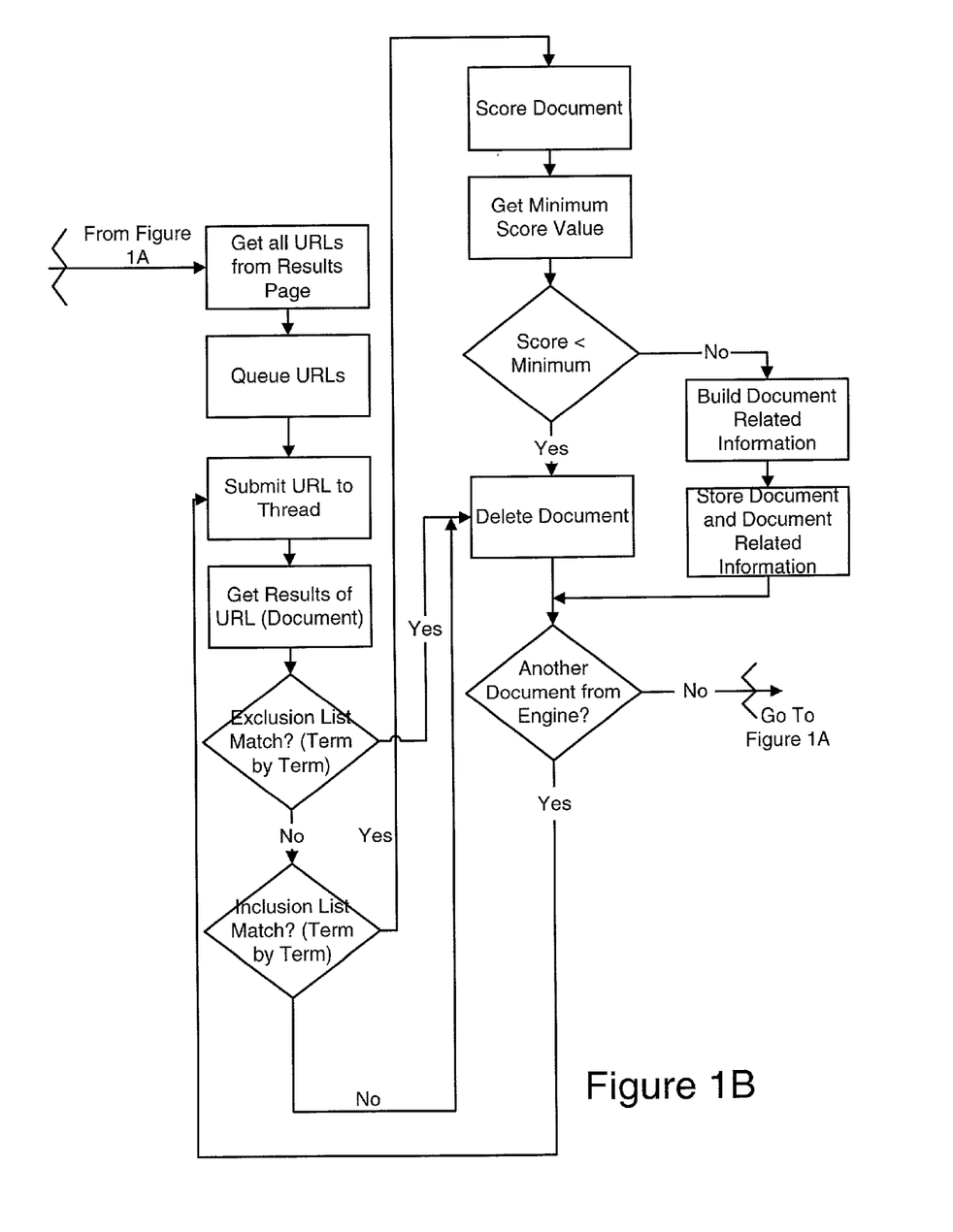
FIG. 1B is a schematic flow diagram of a second portion of the method for efficient control and capture of dynamic database content according to the present invention.

An initial results page is returned by the database being queried. The results page lists the relevant documents available through that database, and may include a next page link to continue listing relevant documents. The executory module follows the links to the relevant documents and retrieves the documents one at a time. Each document is evaluated before it is stored. The evaluation may include comparisons with an exclusion list, inclusion list, and a scoring function. If the document contains any term on the exclusion list the document is deleted and the executory module retrieves the next document. If an inclusion list is used, any document that does not contain at least one of the terms listed on the inclusion list is deleted and the executory module obtains the next document. If a predefined minimum score is not achieved for the document, the document is also deleted. If a document passes all of the evaluation steps it is passes to the document storage and retrieval portion to be stored.

The stored document is then passed to the capture portion. If the capture portion requests a document rather than simply passing a query the document storage and retrieval portion is checked to determine if the document is available without downloading.

The check of the document storage and retrieval portion may also include a document aging portion. The document aging portion verifies that a document is available in the document storage and retrieval portion. If the document is available, the age of the document is determined. Preferably if the document is less than 5 to 10 days old it is considered current. If the document is older than the predetermined limit, then the server responsible for that document on the network is queried to see if the document has been modified. If the document has been modified it is downloaded and stored in the document storage and retrieval portion.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A system for the efficient control and capture of dynamic database content comprising:

a computer system having a storage means for retention and recall of dynamic database content, said computer system having a communications means for performing bi-directional communications between said computer system and a network;

an executory module interfaced to said computer system, said executory module controlling said storage means of said computer system and said communications means of said computer system;

a capture module being in communication with said executory module; and a program of instructions configured to be executed by said executory module and said capture module to:

obtain a query from a user by said capture module;

compare said query, by said capture module, to databases from a database search listing of a plurality of candidate databases;

select, by said capture module, databases relevant to said query obtained by the user;

route said query, by said executory module, to said selected databases so that said selected databases use said query to locate documents relevant to said query;

obtain results, by said executory module, from said selected databases by:

capturing links to relevant documents from a results page obtained from said selected databases, said links providing a path to said relevant documents;

following said links to said relevant documents;

capturing said relevant documents; and process said results.

2. The system of claim 1, further comprising:

a query input means for receiving the query from a user and transferring said query to said capture module.

3. The system of claim 1, further comprising:

a query input means for receiving a plurality of queries from a user and transferring the plurality of queries to said capture module.

4. The system of claim 3, wherein said query input means includes an input module selected from the group of input modules consisting of a keyboard operationally coupled to said computer system, a mouse operationally coupled to said computer system, a data input device capable of converting action of a user to a machine readable query, a data file transferred as an electrical signal to said computer system, a data file transferred as an optical signal to said computer system, a data file written to memory in said computer system accessible by said capture module, and a data file written to a storage media accessible by said capture module.

5. The system of claim 1, further comprising:

a database search listing for providing said capture module with a listing of a plurality of pre-selected databases to use for submission of a query.

6. The system of claim 5, wherein said database search listing further comprises at least one information field containing query format information for formatting queries submitted to each one of said plurality of pre-selected databases.

7. The system of claim 5, wherein said database search listing further comprises at least one information field conveying query format information for formatting of a query associated with at least one of said plurality of pre-selected databases.

8. The system of claim 1, wherein said executory module further comprises a network connectivity portion for establishing and maintaining bi-directional connectivity between said computer system and the network for facilitating the transmittal of at least one query to at least one site on said network.

9. The system of claim 1, wherein said executory module further comprises a network connectivity portion for establishing and maintaining bi-directional connectivity between said computer system and a network for facilitating the transmittal of at least one query to at least one external network, said network connectivity portion also being for establishing and maintaining bi-directional connectivity between said computer system and an internal network to permit queries from a user to be directed databases on both internal and external networks.

10. The system for the efficient control and capture of dynamic database content of claim 9, wherein said network connectivity portion uses a plurality of sockets to establish and maintain bi-directional connectivity with the network.

11. A system for the efficient control and capture of dynamic database content comprising:

a computer system having a storage means for retention and recall of dynamic database content, said computer system having a communications means for performing bi-directional communications between said computer system and a network;

an executory module interfaced to said computer system, said executory module controlling said storage means of said computer system and said communications means of said computer system;

a capture module being in communication with said executory module;

a program of instructions configured to be executed by said executory module and said capture module to:

obtain a query from a user by said capture module;

compare said query, by said capture module, to databases from a database search listing of a plurality of candidate databases;

select, by said capture module, databases relevant to said query obtained by the user;

route said query, by said executory module, to said selected databases so that said selected databases use said query to locate documents relevant to said query;

obtain results, by said executory module, from said selected databases by:

capturing links to relevant documents from a results page obtained from said selected databases, said links providing a path to said relevant documents;

following said links to said relevant documents;

capturing said relevant documents; and process said results;

a query input means for receiving a plurality of queries from a user and transferring the plurality of queries to said capture module;

said database search listing further comprising at least one field conveying query format information for formatting of a query associated with at least one of said plurality of pre-selected databases;

said executory module further comprising a network connectivity portion for establishing and maintaining bi-directional connectivity between said computer system and a network for facilitating the transmittal of at least one query to at least one external network, said network connectivity portion also being for establishing and maintaining bi-directional connectivity between said computer system and an internal network to permit queries from a user to be directed databases on both internal and external networks;

said network connectivity portion using a plurality of sockets to establish and maintain bi-directional connectivity with the network.

12. The system of claim 11, further comprising:

a query queue for storing queries from said query input means until said queries are transferred to said executory module.

13. The system of claim 12 wherein said capture module transfers each one of said queries to said executory module as a thread.

14. The system of claim 12, wherein said capture module uses a plurality of threads to transfer queries to said executory module to thereby establish multiple coexisting sequential flows of control between said capture module and said executory module.

15. The system of claim 11, further comprising:
   a query queue for storing queries from said query input means until each one of said queries are transferred to said executory module; and
   a thread manager for the creation, management, and termination of a plurality of threads between said capture module and said executory module, each one of said plurality of threads transmitting a query from said capture module to said executory module and transmitting a reply from said executory module to said capture module received through one of said sockets from one of said databases.

16. The system of claim 15, wherein said thread manager terminates one of said sockets when one of said databases has completed responses to a series of queries to said database such that each thread terminates upon completion of queries and responses associated with a single database.

17. The system of claim 15, wherein said thread manager further comprises:
   a simultaneous thread count parameter received from said capture module, said simultaneous thread count parameter being used by said thread manager to set an upper bound for a number of simultaneously coexisting threads forming a plurality of threads;
   a thread creation and termination portion adapted for interacting with an operating system for generating a thread associated with one of said databases to be queried;
   a plurality of monitoring portions, each monitoring portion being associated with one of said plurality of threads, said monitoring portion determining a termination point when all responses associated with each one of said plurality of queries directed to an associated one of said plurality of databases have been returned;
   said thread creation and termination portion terminating one of said plurality of threads when said termination point is reached by said monitoring portion associated with said one of said plurality of databases;
   said thread creation and termination portion being operationally linked to said database search listing, said thread creation and termination module generating a new thread if additional databases are to be queried and said simultaneous thread count parameter has not been reached.

18. The system of claim 17, wherein said thread manager further comprises a timeout portion for determining a termination point for use by said thread creation and termination module when a database being queried fails to respond within a predetermined period of time.

19. The system of claim 11, wherein said executory module further comprises:
   a document storage and retrieval portion for retaining documents returned in reply to an associated one of said plurality of queries submitted to each associated one of said plurality of databases.

20. The system of claim 19, wherein said document storage and retrieval portion further comprises:
   a document storage module for retaining each one of a plurality of documents as part of an indexed array for facilitating rapid retrieval of a document by the user.

21. The system of claim 20, wherein said document storage module stores each of said plurality of documents as part of a binary string of data, said plurality of documents being stored in a single file, each one of said plurality of documents being separately accessible.

22. The system of claim 19, wherein said document storage and retrieval portion further comprises:
   an index portion for facilitating rapid recall of any one of said plurality of documents to be recalled from a document storage module.

23. The system of claim 22, wherein said index portion further comprises:
   a B-tree as an indexing structure for said plurality of documents;
   a plurality of core version uniform resource locators, each core version URL providing a path back to a source document from an associated one of the databases queried allowing reconnection to the database which provided the source document.

24. The system of claim 19, wherein said document storage and retrieval portion further comprises:
   a uniform resource locator module for retaining a uniform resource locator associated with each one of said plurality of documents returned by each one of said plurality of databases.

25. The system of claim 19, wherein said document storage and retrieval portion further comprises:
   an entity tag portion for retaining an entity tag associated with each one of said plurality of documents returned by each one of said plurality of databases.

26. The system of claim 19, wherein said document storage and retrieval portion further comprises:
   a record related information portion containing parametric information associated with each one of said plurality of documents, said record related information portion being for facilitating analysis of each one of said plurality of documents.

27. The system of claim 26, wherein said record related information portion further comprises:
   a plurality of offset segments, each one of said plurality of offset segments being a representation of a starting point for an associated one of said plurality of documents in a document storage module;
   a plurality of length segments, each one of said plurality of offset segments being a representation of a length for an associated one of said plurality of documents in said document storage module;
   a plurality of last-time-checked segments, each one of said plurality of last-time-checked segments being a representation of the last known occurrence of collecting an associated one of said plurality of documents in said document storage module;
   a plurality of hit segments, each one of said hit segments being a representation of a number of previous requests received for an associated one of said plurality of documents;
   a plurality of highest-score segments, each one of said highest-score segments being a representation of best results obtained for an associated one of said plurality of documents in said document storage module compiled through use of an arithmetic scoring operation;
   a plurality of database segments, each one of said database segments being a representation of a search engine used to locate an associated one of said plurality of documents in said document storage module.

28. The system of claim 27 wherein each one of said plurality of offset segments, length segments, last-time-checked segments, hits segments, highest score segments, and database segments comprises a 32 bit representation, each one of said segments being stored as part of an array, each one of said offset segments having a one to one correspondence with an index portion linking a stored version of each one of said plurality of documents with an associated one of said parametric information.

29. The system of claim 27 wherein each one of said plurality of offset segments, length segments, last-time-checked segments, hits segments, highest score segments, and database segments comprises a 64 bit representation, each one of said segments being stored as part of an array, each one of said offset segments having a one to one correspondence with an index portion linking a stored version of each one of said plurality of documents with an associated one of said parametric information.

30. The system of claim 19 wherein said document storage and retrieval portion further comprises a version control portion for recording a version identification for said document storage and retrieval portion, said version control portion allowing the user to verify configuration attributes of said document storage and retrieval portion.

31. The system of claim 19, wherein said document storage and retrieval portion further comprises:
  a document storage module for retaining each one of a plurality of documents as part of an indexed array for facilitating rapid retrieval of a document by the user;
  wherein said document storage module stores each one said plurality of documents as part of a binary string of data, said plurality of documents being stored in a single file, each one of said plurality of documents being separately accessible; and
  wherein said document storage and retrieval portion further comprises an index portion for facilitating rapid recall of any one of said plurality of documents to be recalled from a document storage module;
  wherein said index portion further comprises:
    a B-tree as an indexing structure for said plurality of documents;
    a plurality of core version uniform resource locators, each core version uniform resource locator providing a path back to a source document from an associated one of the databases queried for allowing recommendation to the database which provided the source document; wherein said document storage and retrieval portion further comprises:
    a uniform resource locator module for retaining an associated uniform resource locator associated with each one of said plurality of documents returned by each one of said plurality of databases;
    an entity tag portion for retaining an entity tag associated with each one of said plurality of documents returned by each one of said plurality of databases;
    a record related information portion containing parametric information associated with each one of said plurality of documents, said record related information portion being for facilitating analysis of each one of said plurality of documents;
    a plurality of offset segments, each one of said plurality of offset segments being a representation of a starting point for an associated one of said plurality of documents in a document storage module;
    a plurality of length segments, each one of said plurality of offset segments being a representation of a length for an associated one of said plurality of documents in said document storage module;
    a plurality of last-time-checked segments, each one of said plurality of last-time-checked segments being a representation of the last known occurrence of collecting an associated one of said plurality of documents in said document storage module;
    a plurality of hit segments, each one of said hit segments being a representation of a number of previous requests received for an associated one of said plurality of documents;
    a plurality of highest-score segments, each one of said highest-score segments being a representation of best results obtained for an associated one of said plurality of documents in said document storage module compiled through use of an arithmetic scoring operation;
    a plurality of database segments, each one of said database segments being a representation of a search engine used to locate an associated one of said plurality of documents in said document storage module; and
    a version control portion for recording a version identification for said document storage and retrieval portion, said version control portion allowing the user to verify configuration attributes of said document storage and retrieval portion.

32. The system of claim 31, wherein each one of said plurality of offset segments, length segments, last-time-checked segments, hits segments, highest score segments, and database segments comprises a 32 bit representation, each one of said segments being stored as part of an array, each one of said offset segments having a one to one correspondence with an index portion linking a stored version of each one of said plurality of documents with an associated one of said parametric information.

33. The system of claim 31, wherein each one of said plurality of offset segments, length segments, last-time-checked segments, hits segments, highest score segments, and database segments comprises a 64 bit representation, each one of said segments being stored as part of an array, each one of said offset segments having a one to one correspondence with an index portion linking a stored version of each one of said plurality of documents with an associated one of said parametric information.

34. The system of claim 31, wherein said capture module uses a plurality of threads to transfer queries to said executory module to thereby establish multiple coexisting sequential flows of control between said capture module and said executory module;
  a query queue for storing queries from said query input means until each one of said queries are transferred to said executory module;
  a thread manager for the creation, management, and termination of a plurality of threads between said capture module and said executory module, each one of said plurality of threads transmitting a query from said capture module to said executory module and transmitting a reply from said executory module to said capture module received through one of said sockets from one of said databases;
  wherein said thread manager terminates one of said sockets when one of said databases has completed responses to a series of queries to said database such that each thread terminates upon completion of queries and responses associated with a single database;
  wherein said thread manager further comprises:
    a simultaneous thread count parameter received from said
    executory module, said simultaneous thread count parameter being used by said thread manager to set an upper bound for a number of simultaneously coexisting threads forming a plurality of threads;

a thread creation and termination portion adapted for interacting with an operating system for generating a thread associated with an associated one of said databases to be queried;

a plurality of monitoring portions, each monitoring portion being associated with one of said plurality of threads, said monitoring portion determining a termination point when all responses associated with each one of said plurality of queries directed to an associated one of said plurality of databases have been returned;

said thread creation and termination portion terminating one of said plurality of threads when said termination point is reached by said monitoring portion associated with said one of said plurality of databases;

wherein said thread creation and termination portion is operationally linked to said database search listing, said thread creation and termination module generating a new thread if additional databases are to be queried and said simultaneous thread count parameter has not been reached; and wherein said thread manager further comprises a timeout portion for determining a termination point for use by said thread creation and termination module when a database being queried fails to respond within a predetermined period of time.

35. The system of claim 34, further comprising:
a redirected URL handler portion for following redirection of an URL through a plurality of redirections to an ultimate destination without maintaining intermediate pages, said redirected URL handler portion providing an URL for the user of the ultimate document.

36. The system of claim 34, further comprising:
a document aging portion for determining if a current version of a document is available from said document storage and retrieval portion or if the document must be retrieved from another source through said network connectivity portion.

37. The system of claim 36, wherein said document aging portion further comprises:
an aging parameter for selecting a predetermined maximum age for a document to be considered current;
an age module for determining when the document was retrieved from a source and if said age parameter has been exceeded;
a modification module adapted for interrogating a server about any changes made to the document since the document was previously retrieved.

38. The system of claim 37, wherein said modification module uses an entity tag to determine if the document has been modified, said modification module also using a last-modified-since tag if the server does not support use of the entity tag.

39. The system of claim 31, further comprising:
a redirected URL handler portion for following redirection of an URL through a plurality of redirections to an ultimate destination without maintaining intermediate pages, said redirected URL handler portion providing an URL for the user of the ultimate document.

40. The system of claim 39, wherein said document storage and retrieval portion further comprises:
a source URL portion for retaining a URL associated with of each one of a plurality of databases providing documents to said system for the efficient control and capture of dynamic database content;
an ultimate URL portion for retaining a URL associated with each one of a plurality of ultimate destinations obtained through said redirected URL handler portion.

41. The system of claim 31, wherein said executory module further comprises:
a scoring portion for evaluating each one of said plurality of documents for relevance against a query provided by the user, said scoring portion providing a numeric representation of relevance for the user.

42. The system of claim 19, further comprising:
a document aging portion for determining if a current version of a document is available from said document storage and retrieval portion or if the document must be retrieved from another source through said network connectivity portion;
wherein said document aging portion further comprises:
an aging parameter for selecting a predetermined maximum age for a document to be considered current;
an age module for determining when the document was retrieved from a source and if said age parameter has been exceeded;
a modification module adapted for interrogating a server about any changes made to the document since the document was previously retrieved;
wherein said modification module uses an entity tag to determine if the document has been modified, said modification module also using a last-modified-since tag if the server does not support use of the entity tag.

43. The system of claim 42, wherein said executory module further comprises:
a scoring portion for evaluating each one of said plurality of documents for relevance against a query provided by the user, said scoring portion providing a numeric representation of relevance for the user.

44. The system of claim 11, further comprising:
a redirected URL handler portion for following redirection of an URL through a plurality of redirections to an ultimate destination without maintaining intermediate pages, said redirected URL handler portion providing an URL for the user of the ultimate document.

45. The system of claim 11, wherein said executory module further comprises:
a scoring portion for evaluating each one of said plurality of documents for relevance against a query provided by the user, said scoring portion providing a numeric representation of relevance for the user.

46. A system for controlling and capturing dynamic database content comprising:
a computer system having a storage element and a communications element for performing communications between said computer system and a network;
an executory module implemented on said computer system and being configured to control said storage element and said communications element of said computer system;
a capture module implemented on said computer system and being configured to communicate with said executory module; and
wherein said capture module includes:
means for queuing a query from a user;
means for comparing said query to databases from a database search listing of a plurality of candidate databases;
means for selecting databases relevant to said query obtained by the user;

wherein said executory module includes:
    means for routing said query to said selected databases so that said selected databases use said query to locate documents relevant to said query;
    means for obtaining results from said selected databases, including:
        means for capturing links to relevant documents from a results page obtained from said selected databases, said links providing a path to said relevant documents;
        means for following said links to said relevant documents;
        means for capturing said relevant documents; and
    means for processing said results.

47. The system of claim 46, wherein said capture module includes:
    a thread manager to facilitate the submission of said query to said plurality of databases, said thread manager coordinating communication between said executory module and said capture module;
    means for obtaining a thread count parameter for limiting the maximum number of coexisting threads allowed by said thread manager;
    means for establishing a plurality of threads between said capture module and said executory module such than a plurality of coexisting sequential control flows are created between said capture module and said executory module;
    means for establishing a plurality of sockets for said executory module to generate connectivity between said executory module and said selected databases;
    means for assigning each of said selected databases to a specified socket;
    means for obtaining a query from a queue; and
    means for routing said query from said capture module through an associated one of said plurality of threads to said executory module and from said executory module through an associated one of said plurality of sockets to an associated one of said selected databases.

48. The system of claim 47, wherein said means for processing results includes:
    means for providing an aging parameter defining a maximum age of a document to be considered current;
    means for checking said links for said relevant documents returned as a result by said selected databases with documents stored in a document storage and retrieval portion, said document storage and retrieval portion storing all documents captured during a search;
    means for determining if any of said relevant documents is located in said document storage and retrieval portion;
    means for downloading said relevant document if said relevant document is not located in said document storage and retrieval portion;
    means for examining record related information for said relevant document if said relevant document is located within said document storage and retrieval portion;
    means for verifying an age of said relevant document from said record related information;
    means for comparing said age of said relevant document with said aging parameter;
    means for querying a server associated with said relevant document for the existence of modifications to said relevant document if said document is older than the maximum age determined by said aging parameter; and
    means for downloading said relevant document if said document has been modified since the last time the relevant document was downloaded.

49. The system of claim 47, wherein said means for processing results includes:
    means for providing an exclusion list detailing terms, phrases, and sources to be excluded from said results of said query;
    means for comparing said results associated with said query to said exclusion list; and
    means for deleting any said results which match terms, phrases, and sources on said exclusion list.

50. The system of claim 47, wherein said means for processing results includes:
    means for providing an inclusion list detailing terms, phrases, and sources which must be contained in said results of said query;
    means for comparing said results associated with said query to said inclusion list; and
    means for deleting any said results which do not include terms, phrases, and sources on said inclusion list.

51. The system of claim 47, wherein said means for processing results includes
    means for scoring said relevant documents returned from each of said selected databases for relevance compared to said query;
    means for recording a plurality of scores, each score associated with said results from one of said selected databases;
    means for providing a minimum acceptable score for narrowing a quantity of said relevant documents to be considered;
    means for comparing said plurality of scores with said minimum acceptable score; and
    means for deleting documents of said relevant documents which have an associated score numerically less than said minimum acceptable score.

52. The system of claim 46, wherein said executory module includes:
    means for examining URLs of said links to determine if a redirection is used to reach an ultimate location for any one of said relevant documents;
    means for following said URLs to determine if subsequent redirects are used;
    means for capturing an ultimate URL portion associated with at least one of said relevant documents;
    means for capturing a source URL portion identifying which one of said selected databases was a referring source of said relevant document; and
    means for deleting any intervening URLs between said source URL portion and said ultimate URL portion.

\* \* \* \* \*